Patented July 23, 1946

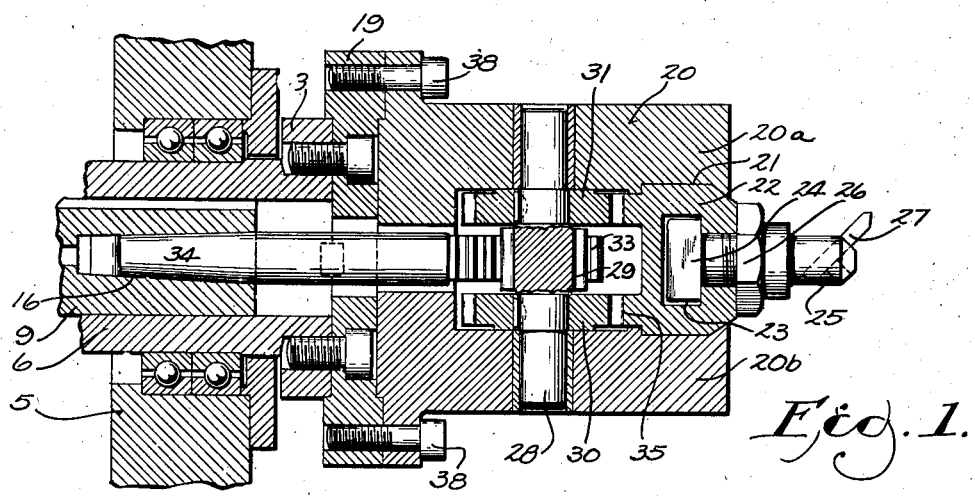
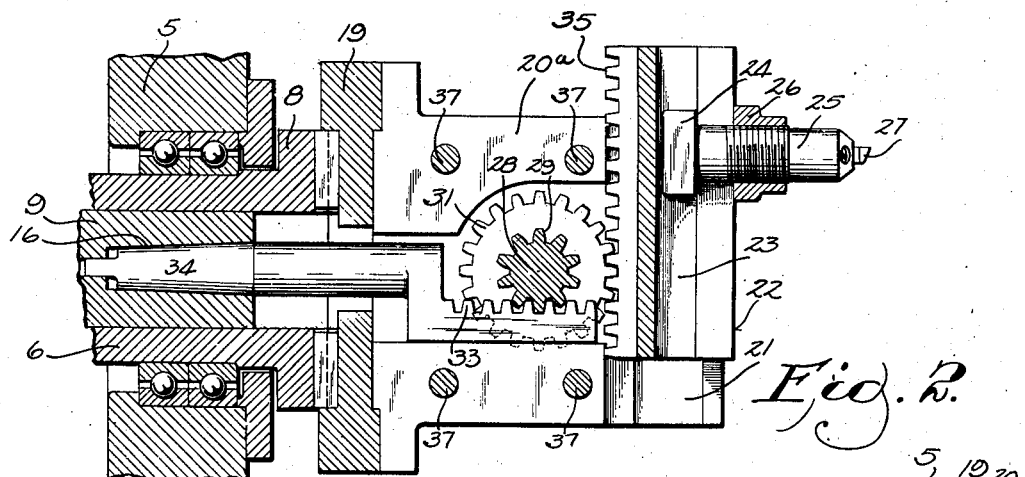
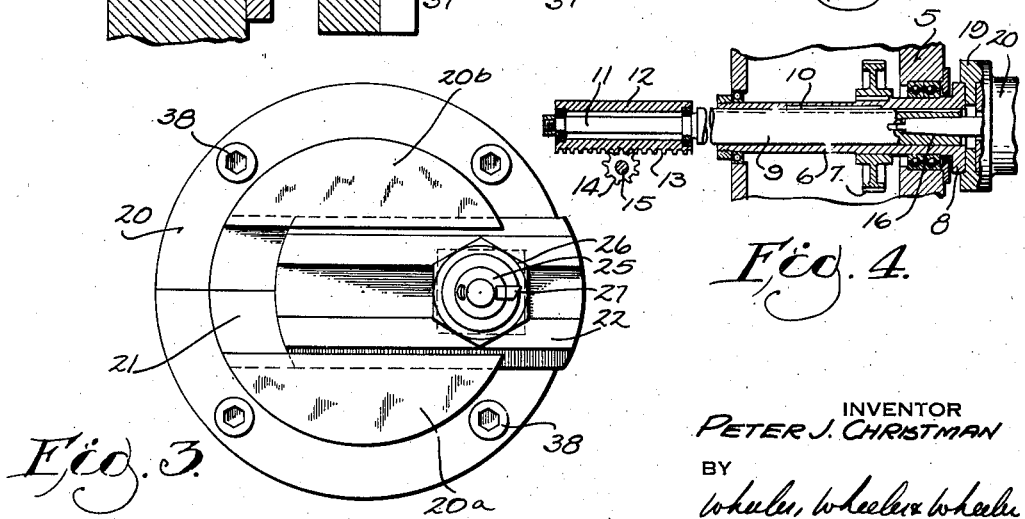

2,404,433

UNITED STATES PATENT OFFICE 2,404,433

FACING AND BORING DEVICE

Peter J. Christman, Green Bay, Wis.

Application November 29, 1943, Serial No. 512,146

9 Claims. (Cl. 77—3)

This invention relates to improvements in facing and boring devices.

It is the primary object of the invention to provide a boring head attachment for a boring and milling machine comprising improved means for feeding a tool radially independently of its rotation at any desired speed or direction.

In the past, facing attachments for machine tools have generally been operated intermittently by means of engagement of rotatable and stationary feed parts once in each rotation of the head for the radial advance of the tool. Such devices have not been reversible in operation nor controllable as to the rate of tool feed in the radial direction. It is an important object of the present invention to provide a construction in which the tool feed can be continuous rather than intermittent, can be controlled as to speed, and can be controlled as to direction during the continuous rotation of the head.

Other objects of the invention will appear more particularly from the following disclosure thereof.

In the drawing:

Fig. 1 is a view of my improved attachment in section, the adjacent parts of the boring and milling machine being also illustrated fragmentarily in section.

Fig. 2 illustrates my improved head and contiguous portions of the boring and milling machine in section in a plane at right angles to the plane in which the parts are illustrated in Fig. 1.

Fig. 3 is an end elevation of the attachment.

Fig. 4 is a view taken in section through a portion of the milling machine fragmentarily illustrating conventional parts thereof on a reduced scale.

Like parts are identified by the same reference characters throughout the several views.

The attachment comprising the present invention is peculiarly adapted for use on boring and milling machines having axially movable boring bars, particularly where such bars are arranged for horizontal movement. Referring first to Fig. 4, the conventional column of such a machine is illustrated at 5. Rotatably mounted in the column is a spindle sleeve 6 of which the last gear in the conventional driving train is indicated at 7.

The spindle sleeve has a face plate at 8 to which the facing head of this invention is attached as will hereinafter be described.

Axially reciprocable through the spindle sleeve is a spindle or boring bar 9 splined at 10 to the sleeve for rotation therewith. For advancing the spindle or boring bar axially of the sleeve, regardless of sleeve rotation, the boring bar has a reduced extremity at 11 on which a quill 12 is journaled so that the rack teeth 13 of the quill may remain in mesh with the rack feed pinion 14, notwithstanding rotation of the spindle or bar 9.

The rack feed pinion 14 is mounted on a shaft 15 which is conventionally driven by power at a variety of speeds, but may also be driven by hand if desired. In an exemplification of a conventional boring bar machine tool, the shaft 15 may be operated in either direction at eight different feed speeds by a motor driven crank speed mechanism (not shown).

At its forward end, the spindle or boring bar 9 has a taper socket 16.

The parts adjacent the spindle sleeve face plate are illustrated on a larger scale in Fig. 1 and Fig. 2. For the purposes of the present invention, a mounting plate 19 is screwed to the face plate as a means of supporting the facing head 20. For convenience of manufacture, the head 20 is preferably made up in two separate parts 20a and 20b which together provide a guideway 21 for the cross slide 22 having a T-slot at 23 in which the head 24 of the tool carrier 25 is adjustably fixed by nut 26. The tool 27 may be mounted in the carrier in any desired manner.

As shown in Fig. 1, the component parts 20a and 20b of the head 20 have registering bores lined with bushings to provide bearings for a cross shaft 28 integrally formed to provide a pinion 29 and to which pinions 30 and 31 are keyed.

Meshing with the pinion 29 is a rack 33 mounted on a rod which extends through the mounting disk 19 and is provided with a tapered end at 34 to fit the taper 16 of the boring bar or spindle. Any movement of the spindle inwardly or outwardly with respect to the spindle sleeve will reciprocate the rack 33 and thereby impart rotative motion to the pinion 29.

The pinions 30 and 31 have twice the radius of pinion 29 and mesh with rack teeth 35 formed at the rear of the slide 22 as best shown in Fig. 2. Thus, the in and out reciprocative motion of the spindle or boring bar is communicated through rotation of the cross shaft 28 to cause radial reciprocation of the slide 22 and the tool carrier and tool mounted adjustably thereon.

It will be apparent to those skilled in the art that the radial reciprocation of the tool may be effected entirely independently of the rotation of the spindle sleeve and head. The appropriate rate of rotation of the drive shaft 15 which actuates the quill and the boring bar or spindle will reciprocate the tool in a radial direction whether the head is stationary or in rotation. Moreover, the rate of tool movement can be accurately controlled and will at all times, in the specific structure disclosed, be double the rate at which the boring bar or spindle is advanced or retracted. Any other desired ratio may be had by simply varying the relative sizes of the pinions on cross shaft 28.

While the details of construction are broadly immaterial, it will be noted that the component parts 20a and 20b of the head 20 are connected together in practice by the cross bolts 37 (Fig. 2) and the head is connected to the mounting plate 19 by the cap screws 38 (Fig. 1 and Fig. 3).

It will be noted that in the combination of the attachment with the machine tool, the boring bar and its driving connections perform an entirely new function in that it now becomes an operator for moving the tool laterally, whereby the machine tool becomes adapted for the performance of a facing rather than a boring operation.

I claim:

1. An attachment of the character described comprising the combination with a centrally apertured mounting member, of a head comprising two parts in connection with each other and said mounting member, said parts having registering cavities providing an interior chamber, a cross shaft mounted in the head and spanning said chamber, a plurality of pinions on the cross shaft connected for rotation, means providing a guideway transversely of said head, a slide provided with a tool holder mounted in said guideway for transverse reciprocation and having rack teeth exposed within the chamber of said head and meshing with one of said pinions, and a part reciprocable transversely with respect to the path of movement of said slide and including a rack within said chamber meshing with another of said pinions, said last part including reciprocable operating means exposed to receive reciprocative motion through the central aperture of the mounting member.

2. An attachment of the character described comprising the combination with a centrally apertured head applicable to a centrally apertured spindle sleeve of a machine tool to be rotated thereby, said head having an interior chamber and a transverse guideway, of a slide reciprocable in said guideway transversely of the axis of rotation of said head with said spindle sleeve, said slide having rack teeth exposed within said chamber at transversely spaced points therein, a cross shaft spanning said chamber and provided with first and second pinions meshing with the spaced rack teeth of said slide, an intermediate pinion on said cross shaft connected for rotation with the pinions first mentioned, and an actuating part exposed to receive motion through the aperture of the head and reciprocable in said chamber parallel to the axis of rotation of said head and comprising a rack meshing with said intermediate pinion.

3. A machine tool attachment comprising a mounting plate applicable to the spindle sleeve of a machine tool for rotation therewith and having a central aperture, a head comprising two parts joined upon a plane paralleling the projected axis of the spindle sleeve to which the mounting plate is applicable, said parts being connected with each other and with said plate and being provided with registering cavities affording a chamber interiorly of said head, a cross shaft spanning the chamber and journaled in the respective parts of said head, a set of three pinions mounted on the cross shaft within said chamber, a part reciprocable axially of said head and including a rack meshing with the intermediate pinion, said part being adapted for connection with a boring bar reciprocable in the spindle sleeve of a machine tool to which said head is attachable, means in the respective parts of said head providing a guideway disposed transversely of the axis of head rotation, a slide reciprocably mounted in the guideway and provided with teeth exposed in the chamber of said head, the rack teeth of the slide meshing with the pinions at either side of said intermediate pinion to receive transverse reciprocation upon the axial reciprocation of said part.

4. A tool carrying head applicable to a machine tool of the type having a rotatably mounted spindle sleeve with a terminal face, and a boring bar reciprocable axially of the sleeve in bearing contact therewith and provided with driving connections behind said sleeve for actuating the bar axially irrespective of sleeve rotation; said tool carrying head comprising a body member provided with means for mounting it on the face at the end of the sleeve, a part reciprocable axially of the head and projecting therefrom and provided with means for connecting it to said boring bar to receive axial movement therefrom, a transversely movable slide carried by the head and provided with rack teeth, the head having a guideway in which said slide is transversely reciprocable, a tool provided with means for mounting it upon the slide, pinion means meshing with the rack teeth of the slide, and a rack connected with said part and meshing with said pinion means whereby axial movement of said part in both directions of boring bar reciprocation is communicated through the pinion means to effect transverse movement of said slide irrespective of rotation of the spindle sleeve and said body portion.

5. A tool head attachment for a machine tool of the type having a rotatably mounted spindle sleeve provided with a terminal face, and a boring bar reciprocable in the sleeve in bearing contact therewith and provided behind the sleeve with driving connections for actuating it axially independently of the rotation of the sleeve, said boring bar being provided within the radius of said sleeve with attaching means; said tool head attachment comprising a body member provided with means for mounting it to the face of said sleeve substantially coaxially with said sleeve and boring bar, said body member being provided at the end remote from said attaching means with a transverse guideway opening to such end, a transversely movable slide reciprocable in the guideway, a tool carrier projecting from said slide and exposed at the end of the body portion, rack means within the body portion connected with the slide for transverse reciprocation therewith, pinion means journaled in the body portion and including pinion teeth meshing with the rack means of said slide, and a part axially reciprocable in the body portion and provided with means projecting therefrom for connection with said boring bar, said part having rack means with which teeth of said pinion means mesh, whereby reciprocation of said boring bar in either direction will communicate motion through the respective rack and pinion means to said slide and tool carrier for the adjustment thereof transversely respecting the axis of rotation of said body.

6. An attachment for a machine tool of the type comprising a spindle sleeve mounted for rotation and a boring bar reciprocable axially through said sleeve; said attachment comprising an attachment body provided with means for mounting it on the end of said sleeve, said body having a central cavity opening toward said boring bar, a part reciprocable axially in said body and provided with means adapted for connection with such a boring bar for reciprocation in both directions therewith, said part having an offset within the body provided with rack teeth, a pinion meshing with said rack teeth and mounted for rotation in the body cavity upon a transverse axis spanning the offset portion of said reciprocable part, a second pinion coaxial with the first and connected therewith for rotation, a slide reciprocable transversely of said body, said body having a guideway in which said slide is operatively mounted for reciprocation, rack teeth connected with the slide and meshing with the second pinion, and means for mounting a tool on the slide to be moved therewith transversely of said body upon reciprocation of said boring bar.

7. An attachment of the character described comprising the combination with a body adapted to be rotated on a predetermined axis and provided with a guideway extending transversely of said axis and opening to one end of said body, a slide reciprocable in the guideway, tool mounting means projecting from said slide and exposed at the end of the body to which said guideway opens, pinion means within the body, said body having a central cavity housing said pinion means and to which said guideway also opens, rack teeth on the slide meshing with said pinion means, and an actuating part having a portion guided for movement within said cavity in a direction axially of the axis of body rotation, said part having rack tooth means meshing with said pinion means for transmitting motion therethrough to said slide.

8. The device of claim 7 in which the rack tooth means of said part is offset from the axis of body rotation and said pinion means being rotatable upon a transverse axis substantially intersecting the axis of body rotation, said part having an attaching portion projecting from said body substantially on the axis of body rotation.

9. A machine tool attachment for a machine tool of the type comprising a rotatably mounted sleeve, and a boring bar axially reciprocable therein; said attachment comprising the combination of a body portion provided with means for mounting it at the end of said sleeve for rotation coaxially therewith, a cross slide having a tool carrier exposed at the end of said body portion opposite to that provided with said attaching means, said body portion having a transverse guideway in which said cross slide is reciprocable and having an interior cavity to which said guideway opens, flanges on the cross slide provided with laterally spaced sets of rack teeth exposed within said cavity, a cross shaft spanning said cavity and having a transverse axis substantially intersecting the axis upon which said body portion is rotatable, a set of three pinions mounted on said cross shaft and connected for rotation in unison, the outermost of said pinions meshing with the rack teeth on the flanges of the slide, and a reciprocable part including a connecting portion adapted for connection with a boring bar for reciprocation along the axis on which said body portion is rotatable, said part having an offset portion disposed within the cavity and provided with rack teeth meshing with the intermediate pinion of said set of three, whereby motion may be communicated from a boring bar with which said part is connected to said pinions and thence to said slide and tool carrier to effect transverse reciprocation thereof.

PETER J. CHRISTMAN.